Figure 3:
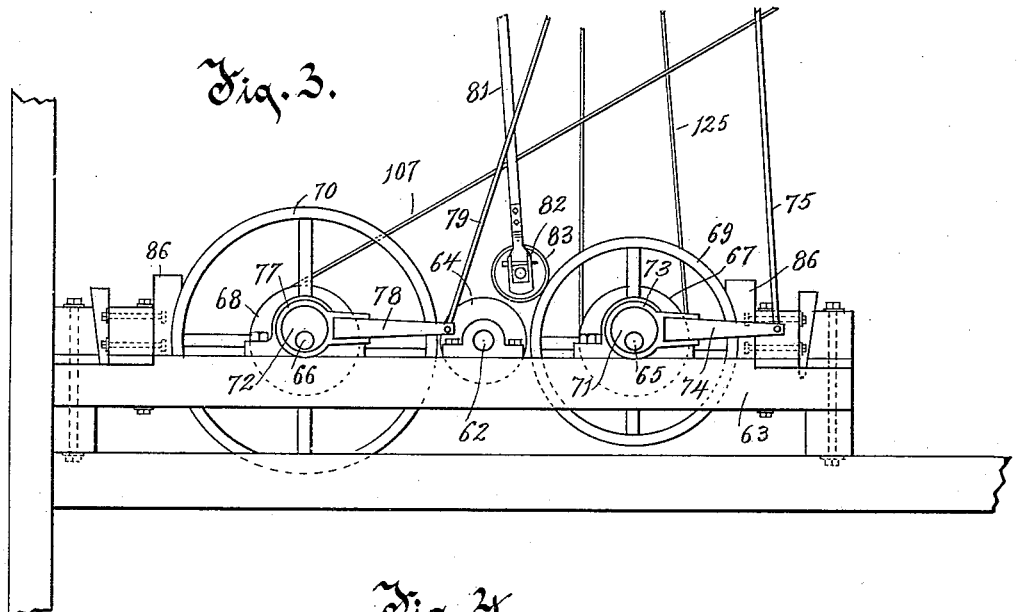

No. 638,722. Patented Dec. 12, 1899.
O. JOHNSON.
APPARATUS FOR ELEVATING, TRANSPORTING, AND DISCHARGING MATERIAL.
(Application filed May 6, 1899.)
(No Model.) 5 Sheets—Sheet 1.
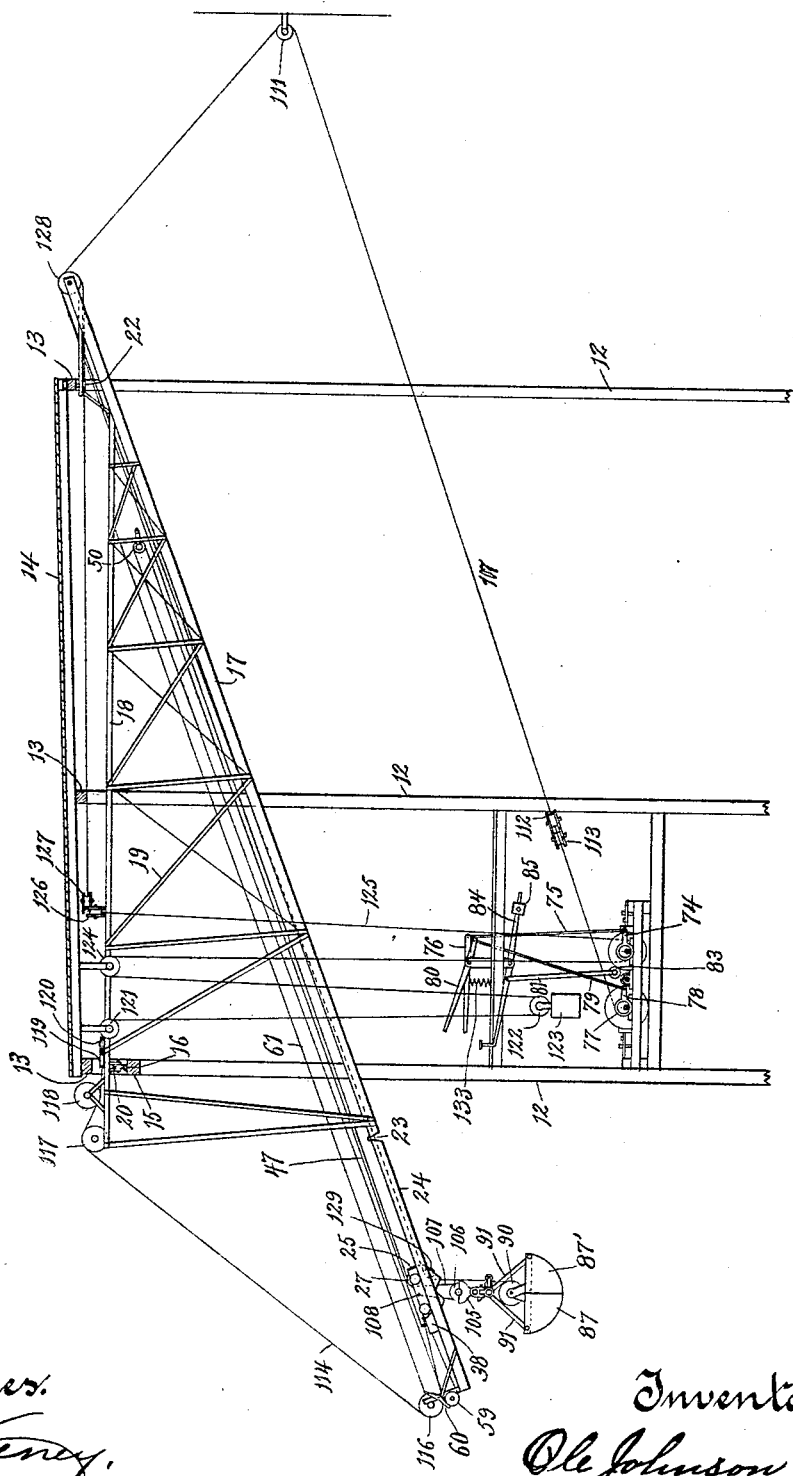

No. 638,722. Patented Dec. 12, 1899.
O. JOHNSON.
APPARATUS FOR ELEVATING, TRANSPORTING, AND DISCHARGING MATERIAL.
(Application filed May 6, 1899.)
(No Model.) 5 Sheets—Sheet 2.
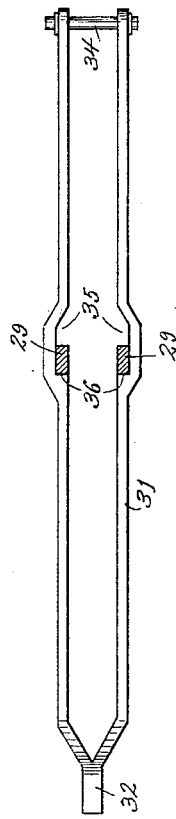
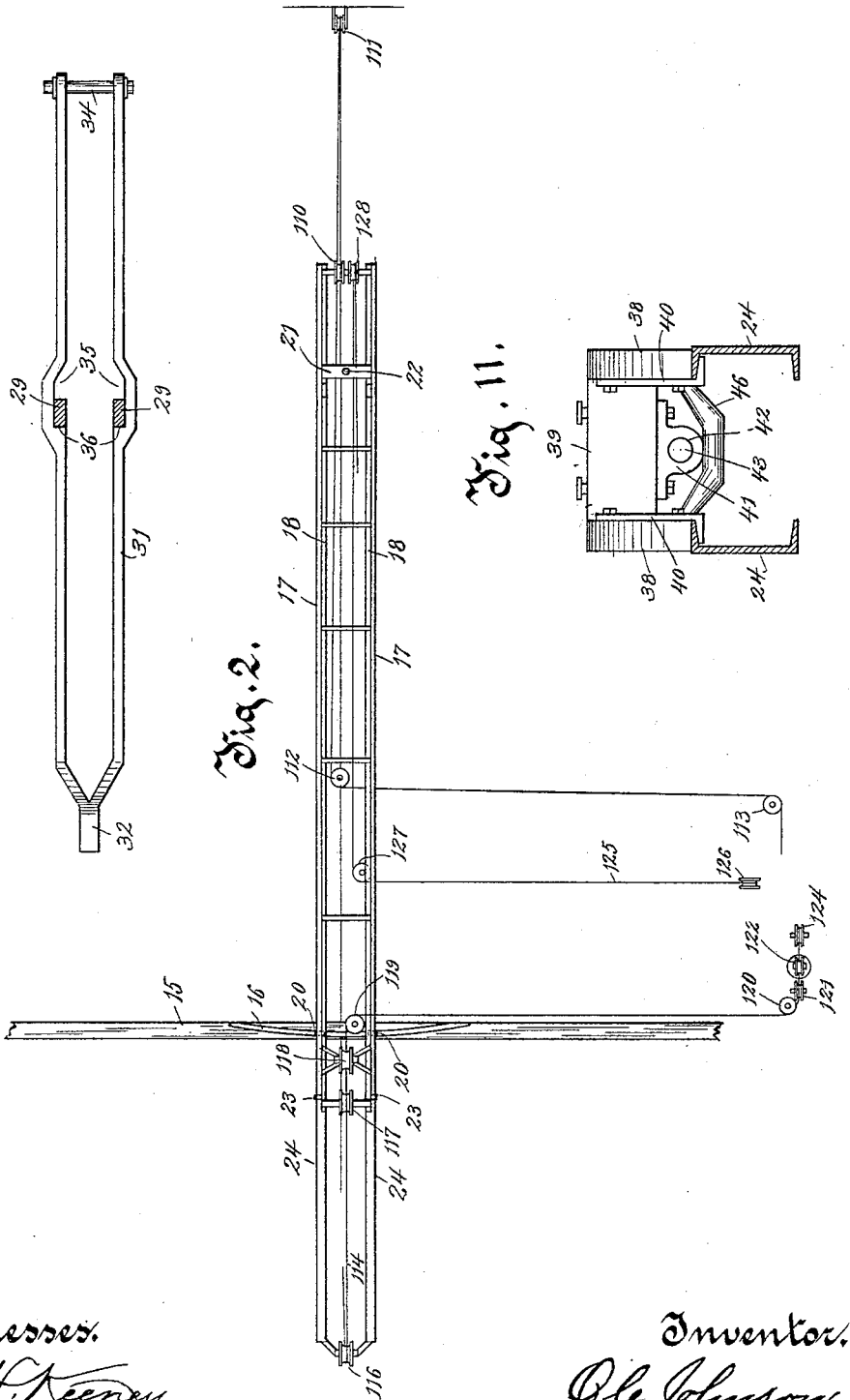

No. 638,722. Patented Dec. 12, 1899.
O. JOHNSON.
APPARATUS FOR ELEVATING, TRANSPORTING, AND DISCHARGING MATERIAL.
(Application filed May 6, 1899.)
(No Model.) 5 Sheets—Sheet 3.

Witnesses:
Inventor.
Ole Johnson.
By Benedict & Morsell.
Attorneys.

THE NORRIS PETERS CO., PHOTO-LITHO., WASHINGTON, D. C.

No. 638,722. Patented Dec. 12, 1899.
O. JOHNSON.
APPARATUS FOR ELEVATING, TRANSPORTING, AND DISCHARGING MATERIAL.
(Application filed May 6, 1899.)
(No Model.) 5 Sheets—Sheet 4.
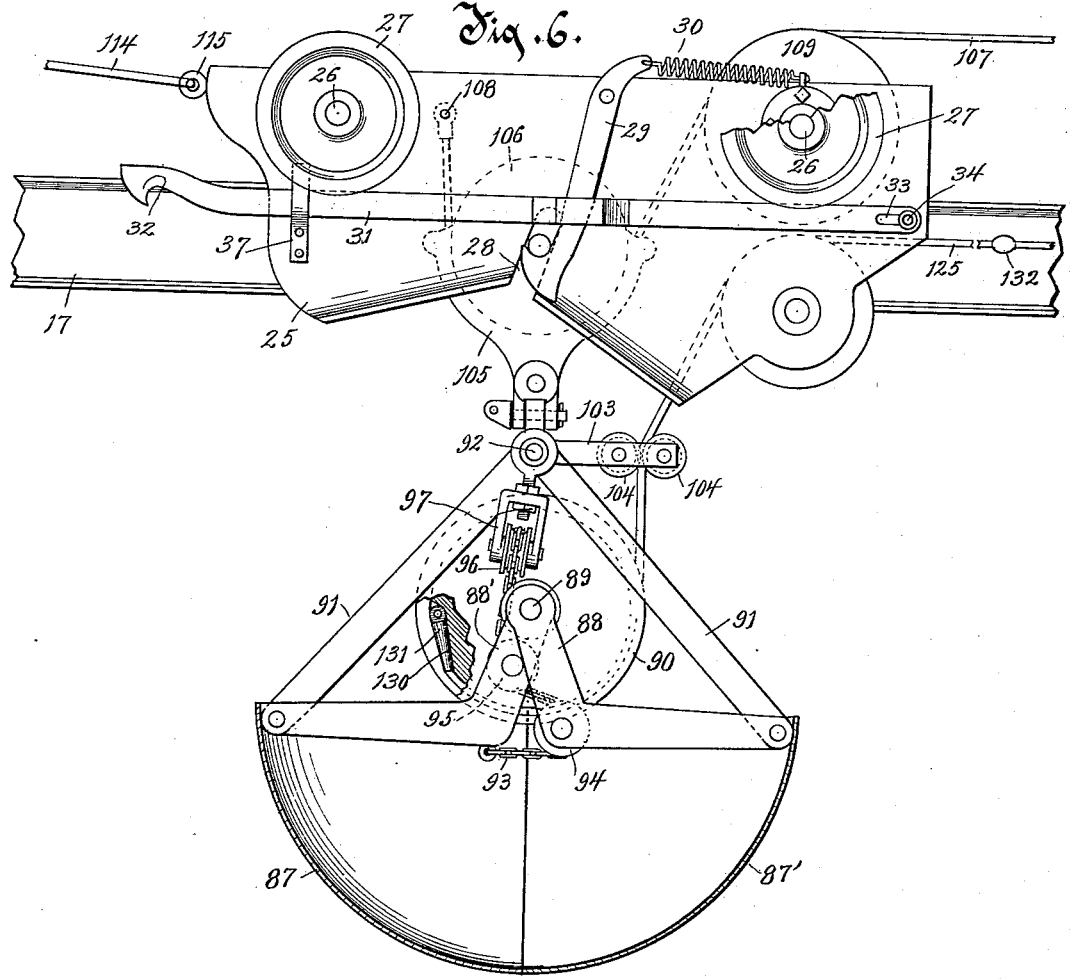
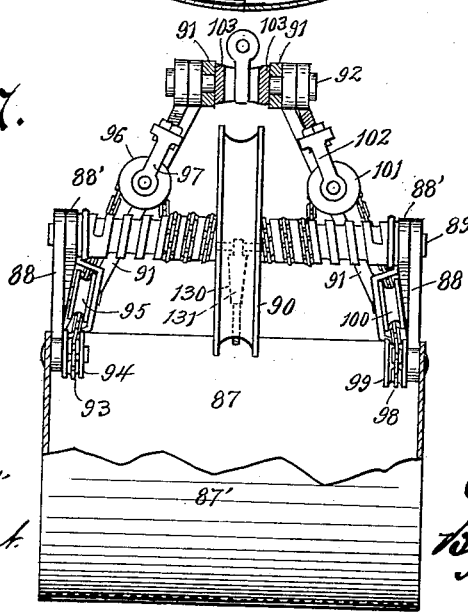
Witnesses. Inventor.
Ole Johnson No. 638,722. Patented Dec. 12, 1899.
O. JOHNSON.
APPARATUS FOR ELEVATING, TRANSPORTING, AND DISCHARGING MATERIAL.
(Application filed May 6, 1899.)
(No Model.) 5 Sheets—Sheet 5.
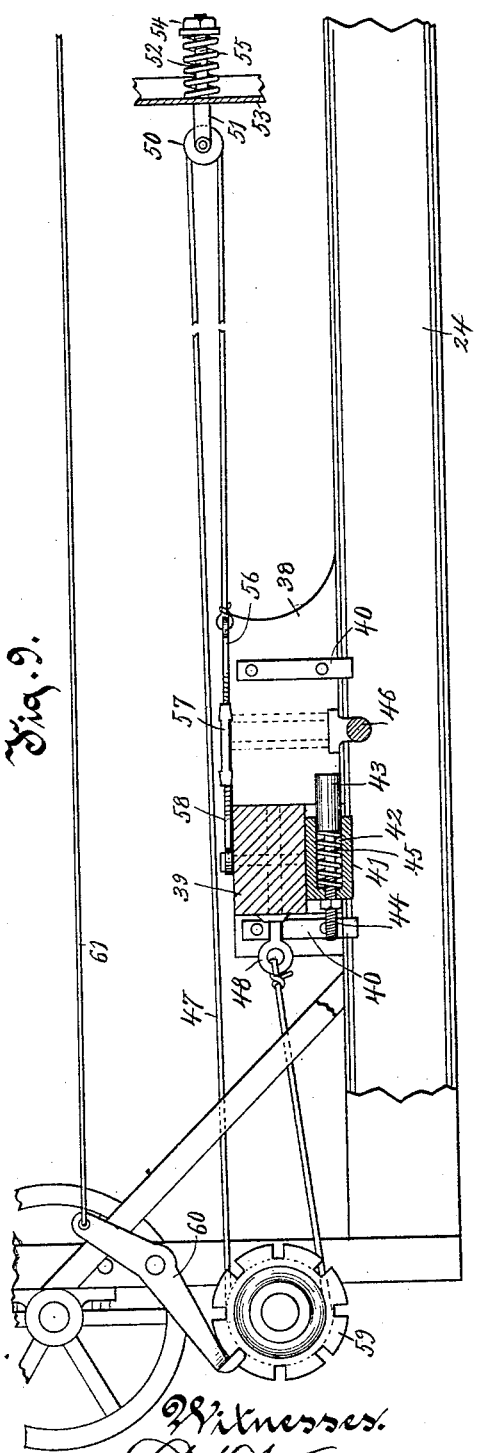
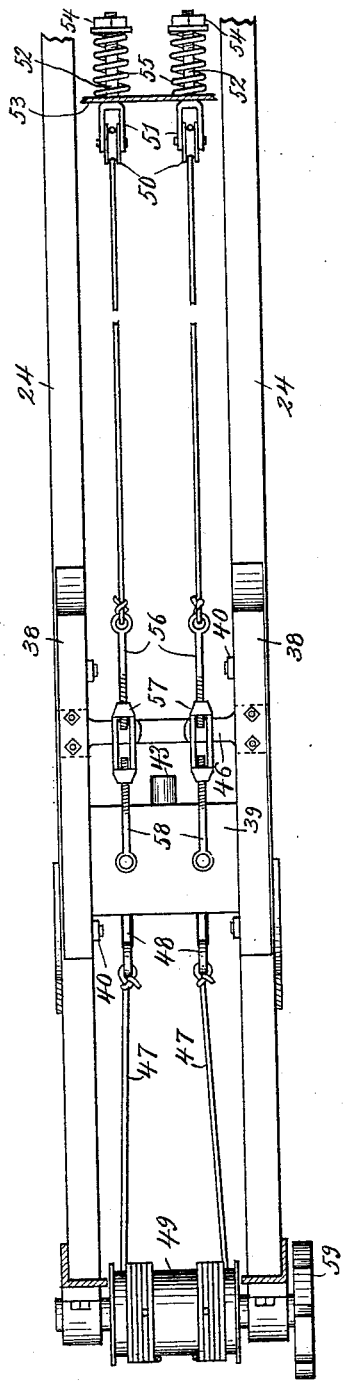

UNITED STATES PATENT OFFICE.

OLE JOHNSON, OF MILWAUKEE, WISCONSIN.

APPARATUS FOR ELEVATING, TRANSPORTING, AND DISCHARGING MATERIAL.

SPECIFICATION forming part of Letters Patent No. 638,722, dated December 12, 1899.

Application filed May 6, 1899. Serial No. 715,810. (No model.)

*To all whom it may concern:*

Be it known that I, OLE JOHNSON, of Milwaukee, in the county of Milwaukee and State of Wisconsin, have invented a new and useful Improvement in Apparatuses for Elevating, Transporting, and Discharging Material, of which the following is a description, reference being had to the accompanying drawings, which are a part of this specification.

My invention has relation to improvements in apparatuses for elevating, transporting, and discharging material.

My invention has relation more especially to improvements in the form of apparatus covered in my pending application for Letters Patent filed December 27, 1898, Serial No. 700,333. In said pending application a counterweight is shown, which counterweight is connected so as to be raised or lowered not only with the raising or lowering of the bucket, but also with the movement of the carriage along the track. This construction is open to objection where a long track is employed, inasmuch as in such case the counterweight is required to be moved upwardly or downwardly a distance corresponding to the length of the track, and consequently a very high frame or structure is necessary.

It is one of the primary objects of my present invention to employ such an arrangement of the counterweight, cables, and the bucket that the counterweight is only raised or lowered when the bucket is raised or lowered, while when the carriage is traveling along the track the counterweight is at a standstill, whereby a great saving in the height of the structure is effected.

A further object effected by the arrangement above referred to is a great saving of power.

A further object contemplated is to provide, in connection and combination with the carrying mechanisms, an improved form of bucket, wherein a greater leverage or power is provided for closing the pivoted bottom sections of the bucket than has heretofore been attained in this class of buckets, said power increasing as the pivoted bottom sections of the bucket approach nearer and nearer to a closed position.

A still further object resides in the provision of an improved form of adjustable stop mechanism.

With the above primary and other incidental objects in view the invention consists of the devices and parts or their equivalents, as hereinafter more fully set forth.

Figure 4:
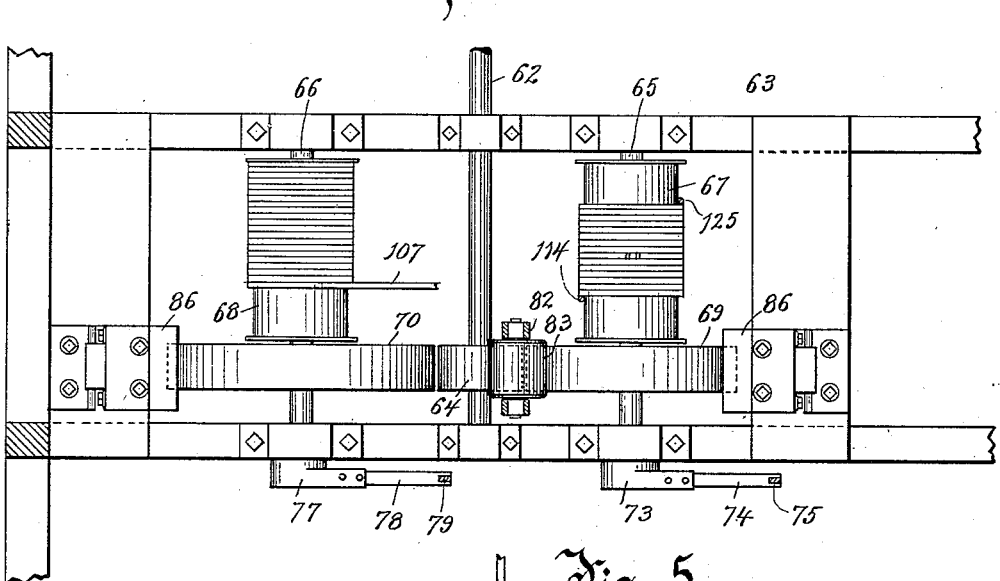
Figure 5:
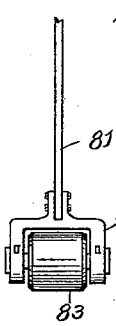

In the accompanying drawings, Figure 1 is a side elevation of the complete apparatus. Fig. 2 is a plan view of the upper portion of Fig. 1 with parts removed and showing the location of the pulleys. Fig. 3 is a side elevation of the driving mechanism. Fig. 4 is a plan view of Fig. 3. Fig. 5 is a detail view of the reversing-wheel and the arm carrying the same. Fig. 6 is a side elevation of the carriage and part of the track, showing the bucket in side elevation, parts being shown as broken away. Fig. 7 is an end view of the bucket with parts broken away. Fig. 8 is a plan view of the holding and releasing arm for the carriage. Fig. 9 is a view of one end of the track, showing the stop and the mechanism for adjusting the same, parts being in section and parts broken away. Fig. 10 is a plan view of Fig. 9, and Fig. 11 is an end view of the stop.

In Fig. 1 of the drawings I show a permanent or fixed main frame or structure consisting of upright posts 12, connecting cross-beams 13 at the upper ends of said posts, and a top or cover 14. The forward upright posts are also connected by means of another cross-beam 15, arranged below the forward cross-beam 13 and formed on its upper side with a rail 16, which rail is curved in the arc of a circle.

In Figs. 1 and 2 of the drawings I show a boom-frame arranged at a gradual declination toward the front of the frame and consisting of two lower parallel side bars 17 17 and upper bars 18 18. These lower and upper bars 17 and 18, respectively, are connected by diagonal connecting-rods 19. The lower bars are preferably of the form of channel-irons. On the under sides of the bars 18, near the forward ends of said bars, are carried rollers 20 20, which ride on the curved rail 16. Near the rear end of the boom-frame is a cross-bar 21, through which a pivot-pin 22 passes and extends through the rear cross-beam 13. This pivot permits of a swinging of the boom-frame, so that the forward end of said frame is capable of swinging to a limited extent in the arc of a circle, the rollers 20 at the forward end of said boom-frame riding on the curved rail 16.

Pivoted to the forward ends of the lower pieces 17 of the boom-frame is a projecting boom, the pivot 23 thereof being such that the boom is capable of an up-and-down swinging movement. This boom is composed of two side pieces 24 24, preferably in the form of channel-irons, and forming continuations of the side pieces 17 of the boom-frame, and together therewith forming a track for the travel of the carriage thereon. This carriage consists of two side pieces, (indicated by the numeral 25,) and mounted in these side pieces are axles 26 26, on which are mounted wheels 27 27, said wheels adapted to run on the rails of the boom-frame and boom. The lower edge of each of these side pieces of the carriage is preferably cut away in the form of an inverted V, as clearly shown in Fig. 6, and from the apices of these V-shaped cuts slots 28 extend upwardly. Pivoted to the side pieces of the carriage are levers 29 29. The lower ends of the long arms of these levers are formed with hooks, as clearly shown, and the upper short arms of said levers have connected thereto the ends of coiled springs 30, the opposite ends of said springs being connected to the side pieces of the carriage. The numeral 31 indicates the locking-arm, which is in the form of a yoke, as most clearly shown on Fig. 8, so as to provide two side members which are adjacent to the side pieces of the carriage. The forward ends of these side pieces are united to form a hook 32. The rear ends of the side members of this locking-arm are formed with elongated slots 33, through which a transverse pin 34 passes, said pin also of course extending through openings therefor in the side pieces of the carriage. At opposite medial points the side members of the locking-arm are formed on their inner sides with recesses 35 35, said recesses terminating at their forward ends in abrupt shoulders 36 36. The forward portions of the side members of the locking-arm are held to the side pieces of the carriage by means of keepers 37.

The adjustable stop mechanism consists of two side pieces 38 38 and a connecting transverse block 39. The rear ends of the side pieces 38 are curved, as clearly shown in Figs. 9 and 10. Each side piece 38 has straps 40 secured to its inner side, one of the straps of each side piece being located near the forward end of said side piece and the other strap near the rear end thereof. The lower ends of the straps extend below the side pieces and are turned outwardly beneath the flange of the beams forming the rails of the track, as clearly shown in Fig. 11, whereby a means is provided for slidingly retaining the stop mechanism on the track. To the under side of the block 39 is secured, by means of bolts or equivalents, a casting or bracket 41, said casting or bracket formed with a chamber 42. The numeral 43 indicates a bumper-head which extends into the chamber 42 and is provided with a projecting stem 44, the forward end of said stem extending freely through an opening in the forward end of the casting or bracket 41. Within the chamber 42 is arranged a coiled spring 45, which surrounds the stem 44. The side pieces 38 of the stop mechanism are connected at or near their lower edges and toward their rear ends by means of a transverse rod 46, which rod at its center is bent downwardly, as most clearly shown in Fig. 11, so as to be readily engaged by the hook 32 at the forward end of the locking-arm. Connected to the forward side of the block 39 are ropes or cables 47 47, said ropes or cables being preferably connected with screw-eyes 48 48, extending forwardly from the block 39. These ropes or cables are wound a plurality of times around a drum 49 and thence extended rearwardly and around pulleys 50 50. The blocks 51 51 of said pulleys are at the forward ends of rods 52 52, said rods passing through a fixed beam or timber 53 and having on their rear threaded ends nuts 54 54. The rods are encircled by coiled springs 55 55, arranged on the rods between said nuts and the rear side of the timber or beam 53. The cables after passing beneath the pulleys 50 are extended to and connected with rods 56 56, said rods having threaded connections with turnbuckles 57 57. Other rods 58 58 have threaded connections at their rear ends with the turnbuckles and at their forward ends are connected to the block 39. By means of the turnbuckles any slack in the ropes or cables 47 may be readily taken up. Mounted on the shaft or axle of the drum 49 is a ratchet-wheel 59, which is adapted to be engaged by a medially-pivoted dog or pawl 60. The upper end of this dog or pawl has connected thereto an operating-cable 61, which is extended rearwardly in convenient position to be operated. By providing an adjustable stop mechanism I am enabled to set the stop at any position on the track, so that the loading and discharging may be accomplished at any desired point along said track. In order to accomplish this adjustment, the carriage is locked to the stop by causing the engagement of the hook 32 with the transverse rod 46. The operating-cable 61 is now pulled, so as to disengage the pawl 60 from the ratchet-wheel 59. The stop and carriage are now free to be moved together to any desired position in the manner hereinafter to be described, and when the proper adjustment is obtained the operating-cable is released, so as to permit the dog or pawl to again engage the ratchet-wheel and lock the stop in its adjusted position. The coiled springs 55 not only serve to keep the cables 47 taut, but, furthermore, tend to assist in lessening the shock when the carriage is brought into engagement with the stop. It will be understood that only one cable 47 would be sufficient for the purpose of providing for the adjustment of the stop. I prefer, however, to employ two of these cables, as shown, in order to obtain greater strength and security.

The driving mechanism is shown in detail in Figs. 3 and 4 of the drawings. Referring to this mechanism, the numeral 62 indicates a shaft which is mounted in the side pieces of a rectangular frame 63. One end of this shaft projects beyond one of the side pieces of said frame and carries thereon a belt-pulley or gear-wheel, (not shown,) whereby said shaft may receive rotation from any suitable source of power. This shaft has mounted thereon a friction-pulley 64. The shaft 62 occupies an intermediate position between two other shafts 65 and 66, which are also mounted in the rectangular frame. These shafts 65 and 66 have drums 67 and 68 mounted, respectively, thereon and also friction-pulleys 69 and 70 mounted, respectively, thereon, said pulleys being larger than and in line with the friction-pulley 64. One end of each of the shafts 65 and 66 has mounted thereon eccentrics. The eccentric for shaft 65 is indicated by the numeral 71 and the eccentric for shaft 66 by the numeral 72. Eccentric 71 is surrounded by an eccentric-ring 73, and to this ring is connected an arm 74, said arm in turn having secured to its outer end a link 75. To the upper end of this link is pivotally connected a medially-pivoted lever 76. (See Fig. 1.) The eccentric 72 is also surrounded by an eccentric-ring 77, and this ring has projecting therefrom an arm 78, said arm having pivotally connected thereto a link 79, the upper end of said link being jointed to a medially-pivoted lever 80. The numeral 81 indicates an arm which is formed or provided at its lower end with a yoke portion 82. Journaled in the ends of this yoke is the shaft or axis for a small friction-wheel 83, preferably a paper friction. This small friction-wheel is located above the friction-pulley 64 and adjacent to the large friction 69. To the upper end of the arm 81 is jointed a medially-pivoted foot-lever 84. One arm of this lever has an adjustable weight 85 mounted thereon, which weight normally holds the friction-wheel 83 out of contact with the driving friction-wheel 64. The numerals 86 86 indicate brakes, the inner faces of which are curved to conform to the curvature of the friction-pulleys 69 and 70.

My improved form of clam-shell bucket is provided with the usual bottom sections 87 87'. Arms 88 88' extend upwardly from each end of the bucket, one arm extending upwardly from the inner portion of the upper edge of one of the bottom sections and the other arm extending upwardly from the inner portion of the upper edge of the other section. The two arms of each set are converged toward and to each other, and both sets of arms are connected by a transverse shaft 89. Mounted rigidly on the center of this shaft is a large grooved pulley 90. The shaft on each side of this central pulley 90 is formed with reverse worms or diagonal grooves, as clearly shown in Fig. 7. Extending upwardly from opposite ends of the bucket are links 91 91. Through the upper ends of these links passes a pin 92. Secured to the bottom section 87 of the bucket, at one end thereof, is a chain 93. This chain is carried to and around a pulley 94, carried by the bottom section 87'. It is thence extended laterally to and around a pulley 95, carried by the arm 88 at one end of the bucket, thence upwardly to and around a pulley 96, carried in a block 97, suspended adjustably from the pin 92. Also secured to the bottom section 87 at the opposite end thereof is another chain 98. This chain is extended to and around a pulley 99, carried by the bottom section 87', thence laterally around a pulley 100, similar to pulley 95, and finally upward over a pulley 101, similar to pulley 96, said pulley 101 being carried in a block 102, suspended adjustably from the pin 92. Chain 93 after passing over pulley 96 is extended to and connected with the worm-groove portion of the shaft 89 on one side of the central pulley 90, and the chain 98 is extended from pulley 101 to the worm-groove portion of shaft 89 on the opposite side of the pulley 90. Extending out laterally from the pin 92 are two arms 103 103, and between these arms are mounted pulleys 104 104. Connected to the pin 92 is a shell 105 for a pulley 106.

The hoisting-cable is indicated by the numeral 107. This cable is secured to the carriage at the point 108 and is then extended downwardly and around pulley 106, thence upwardly and around a pulley 109, mounted on one of the axles 26 of the carriage, and is thence extended rearwardly over a pulley 110, thence rearwardly and downwardly at an incline and around another pulley 111, thence forwardly and over another pulley 112, thence downwardly and under a pulley 113, located immediately below pulley 112, and is finally extended from pulley 113 to and connected with drum 68.

The cable for opening and closing the bottom sections of the bucket is indicated by the numeral 114. This cable is connected to the forward end of the carriage at the point 115. It is then extended to and around a pulley 116 at the forward end of the pivoted boom, thence extended upwardly and rearwardly and over a pulley 117, thence under a pulley 118, thence around another pulley 119, thence laterally to and around a pulley 120, thence to a pulley 121, thence downwardly and around a pulley 122, carried in a block extending upwardly from a counterweight 123, thence from the pulley 122 upwardly and around another pulley 124 at the top of the frame or structure, and thence downwardly for connection to the drum 67. The cable is wound around this drum a plurality of times and fastened, and it may be continued from the drum, or a separate cable may be connected to the drum and continued therefrom. This continuation of the cable 114 of the separate cable, as the case may be, is indicated by the numeral 125. This cable 125 first passes around a pulley 126, thence around a quartered pulley 127, thence extended rearwardly and around a pulley 128, and from said pulley 128 forwardly to the carriage and around a pulley 129, mounted in the carriage, and thence downwardly to the bucket and connected to the pulley 90 of said bucket. The preferable means of connecting the cable 125 to the bucket consists in forming a recess 130 in the groove of said pulley and pivoting in said recess an eyelet 131, in which eyelet the cable extends and is fastened therein.

The operation of my invention is as follows: In the position of the bucket shown in Fig. 1 it will be supposed that said bucket is descending into the hold of the vessel. When it is thus descending, neither the friction-wheel 69 nor the friction-wheel 70 is in direct engagement with the small driving friction-wheel 64. As the bucket thus descends the hoisting-cable 107 unwinds from the drum 68, the speed of rotation of said drum being regulated by engagement of the friction-wheel 70 with the brake 86, said engagement being effected by operating the lever 80, and that portion of the cable 114 between the attaching-point 115 thereof and the counterweight 123 remains stationary. That portion of said cable 114, however, leading from the counterweight 123 to the drum 67 is wound upon said drum 67, and consequently the counterweight is raised. Cable 125 at the same time is unwound from the drum 67. The lowering of the bucket is continued until the place where it is desired to take the load is reached. The lever 76 is then raised, and this raising of the lever has the effect of throwing friction-wheel 69 into engagement with the driving friction-wheel 64, and consequently drum 67 is rotated, so as to wind up cable 114 and unwind cable 125, leading to the bucket, which cable then winds upon the pulley 90 of the bucket, thereby causing the chains 93 and 98 to unwind from the reversely-grooved shaft 89 and thereby permitting the pivoted sections of the bucket to open. In order to understand this operation, it must be borne in mind that the natural tendency of the pivoted bottom sections of the bucket is to open, and this tendency is only restrained by reason of the chains 93 and 98 being wound up on the shaft 91. When the cable 125 is wound up on the drum 67, it is unwound from the pulley 90, and this turning of the pulley 90 causes the shaft 89 to be turned in a direction to wind up the chains 93 and 98 thereon, as clearly shown in Fig. 7. When, however, the cable 125 unwinds from the drum 67, and consequently winds up on pulley 90, this winding of the cable 125 on the pulley 90 causes the shaft 89 to be rotated in a direction to unwind the chain 93 and 98 therefrom, and consequently there is no further restraint to the free opening of the pivoted bottom section of the bucket. It will be understood that it is not absolutely necessary that the bucket be lowered to its full extent or be at rest when the opening is effected, as the pivoted bottom sections can be opened while the bucket is in the act of lowering merely by making the bucket lower at a slow rate of speed. To prevent the cable 125 from becoming too slack after the bucket is thus lowered and opened, I provide a stop 132 on said cable, which stop comes in contact with the two pulleys 104 104, and hence prevents further slack of the cable below said pulleys. In order to fill the bucket, the pivoted bottom sections thereof are of course required to be closed. This is accomplished by first throwing friction-wheel 69 out of contact with the friction-wheel 64 and then throwing the reversing friction-wheel 83 into engagement with the friction-wheel 69, so that said reversing friction-wheel will be in engagement with both the friction-wheel 69 and the friction-wheel 64. The drum 67 is thereby rotated in a direction to cause the cable 125 leading to the bucket to be wound upon the drum 67, so as to pull on said cable 125, and thereby lower the counterweight, the pull on said cable and the lowering of the counterweight causing the closing of the pivoted bottom sections by reason of the fact that the shaft 89 is rotated in a direction to wind up the chains 93 and 98 on said shaft, said chains arranging themselves in the reverse grooves of the shaft. These grooves therefore effect an even winding of the chains. It is obvious that by this construction a great leverage is obtained, and the power is constantly increased as the pivoted bottom sections of the bucket approach a closed position. After the closing of the bucket the next step is to hoist the bucket to the carriage and then cause the travel of the carriage along the track. To accomplish this, the reversing friction-wheel 83 is released from engagement with the friction-wheels 64 and 69 merely by taking off the pressure on the lever 76, the contracting of the spring 133 below the lever pulling said lever down to a normal position. The next step is to bear down on lever 80. This will cause the friction-wheel 70 to be thrown into engagement with the small driving friction-wheel 64, and consequently rotate the drum 68 in a direction to wind up on the hoisting-cable 107. This will of course raise the bucket, and as the bucket is thus raised the counterweight descends, owing to the fact that the portion of the cable 114 leading from the counterweight to the drum 67 unwinds from said drum, while cable 125 winds up on said drum. This movement of the counterweight, it will be understood, always holds the pivoted bottom sections of the bucket closed. After the bucket is locked to the carriage the continued rotation of the drum 68 will cause the carriage and the attached bucket to travel along the track. The locking of the bucket to the carriage is effected by the contacting of the trunnions of pulley 106 with the lower hooked ends of the levers 29, said contact thrusting the long arms of the levers rearwardly and permitting the trunnions to pass up into the slots 28. The moment the trunnions pass above the hooked ends of the levers 29 the coiled springs 30 of course return the levers 29 to their normal position to engage under the trunnions of the pulley 106. At this time the hook 32 is released from the rod 46, so as to permit the travel of the carriage along the track, and this release is effected by reason of the contact of the trunnions of pulley 106 with the side members of the arm 31 on the up movement of said trunnions in the slots 28 in the act of locking the bucket to the carriage, the up movement being sufficient to release the hook 32 from the rod 46. When the carriage and the attached bucket are traveling along the track, it will be understood that the counterweight is at a standstill, owing to the fact that cable 114 pays out and cable 125 winds up on the drum 67. When the point is reached where it is desired to discharge the material, the carriage is stopped by stopping the rotation of the drum 68, and the pivoted bottom sections of the bucket are opened in the manner already fully described and the material thereby discharged.

The spring 133, which is located beneath lever 76, normally holds the friction-wheel 69 out of engagement with the brake 86 and the driving-friction 64.

After the material is discharged and it is desired to return the carriage and bucket to the end of the boom or to any other position to which the stop mechanism is adjusted the lever 80 is manipulated so as to throw friction-wheel 70 out of engagement with brake 86. This will permit cable 107 to unwind from the drum 68 and permit the carriage and bucket to travel forwardly. In this movement of the carriage cable 114 winds on the drum 67 and cable 125 unwinds therefrom, and at the same time the counterweight remains stationary. When the carriage reaches the end of its travel, as regulated by the stop mechanism, the hook 32 of the locking-arm 31 will engage over the rod 46, and will also contact with the bumper 43, said bumper preventing jar and concussion. This engagement of the hook of the locking-arm 31 will occur, however, before the carriage has quite completed its full movement. At this time it is impossible for the levers 29 to turn on their pivots, as said levers are bearing against the abrupt shoulders 36 of the recesses 35. (See Fig. 8.) The forward movement of the carriage to the extent permitted by the slots 33 will cause a pull on the upper arms of the levers 29 and a consequent turning of said levers on their pivots, so as to release the hooks of the levers from engagement with the trunnions of the pulley 106, whereby the bucket is unlocked and is permitted to descend, the levers 29 returning to their normal positions by the action of the coiled springs 30 the moment the carriage has fully completed its movement. When the carriage completes its full movement, the pulley 27 contacts with the curved side pieces 38 of the stop mechanism.

Whenever it is desired to adjust the stop mechanism, it is necessary first that the carriage be connected thereto. If, for instance, the stop mechanism is now desired to be adjusted forwardly, the dog or pawl 60 is first released from the ratchet-wheel 59 by pulling on the operating-cord 61, as previously explained. Lever 76 is next operated by lifting the same up, and this operation will throw the friction-wheel 69 into engagement with the driving friction-wheel 64 and cause a rotation of drum 67 in a direction to unwind cable 125 and wind up cable 114. This will of course pull the stop mechanism forwardly, and when the desired position is reached the lever 76 is released and the pawl 60 is again permitted to engage the ratchet-wheel 59. If, however, it is desired to adjust the stop mechanism rearwardly, then either the foot-lever 84 or the lever 80 may be operated, so as to throw either reversing friction-wheel 83 into operation or to throw friction-wheel 70 into operation, and this will of course cause a movement of the stop mechanism rearwardly.

From the above description it is thought that the operation, construction, and advantages of my invention will be readily understood. It will be evident that from the fact the counterweight remains stationary when the carriage is traveling along the track a great saving of power is obtained and at the same time there is no necessity for providing a very high structure where a long track is provided, as would be the case where a counterweight is employed which requires to be moved upwardly or downwardly while the carriage is traveling along the track.

My improved form of bucket possesses great advantages for the reason that a very great leverage is secured, whereby increased power is obtained, which is gradually accelerated or augmented as the pivoted bottom sections of the bucket approach nearer and nearer to a closed position. It is evident that an advantage is gained where greater power is secured as the pivoted jaws or sections approach a closed position, inasmuch as at this time greater power is required in order to operate the jaws against the material which has almost filled the bucket.

While I have shown the cable 114 as connected to the forward end of the carriage, said cable may be connected to and extend from the rear end of the carriage without departing from the spirit and scope of my invention.

While the chains 93 and 98 are shown as connected to the section 87 of the bucket and then extended, respectively, to and around pulleys 94 and 99, carried by section 87′, yet this exact arrangement is not absolutely essential, as the pulleys 94 and 99 could be omitted and the chains connected first to the section 87' and extended directly from said section to the pulleys 95 and 100.

What I claim as my invention is—

1. In an apparatus for elevating, transporting, and delivering material, the combination of a track, a carriage adapted to travel on said track, a bucket having pivoted bottom sections, mechanism for permitting of the opening and closing of said pivoted bottom sections, drums, mechanism for causing the rotation of either of the drums in either direction, mechanism for stopping the rotation of either of said drums, a hoisting-cable connected to the carriage and extending downwardly to and around a pulley, or equivalent, connected to the bucket, and thence extended for connection to one of the drums, a counterweight, an opening and closing cable connected to the carriage and thence extended to the counterweight, and from the counterweight to one of the drums, and another cable engaging the last-named drum and continuing from the last-referred-to cable, and extended for connection to the opening and closing mechanism of the bucket.

2. In an apparatus for elevating, transporting, and delivering material, the combination, of a track, a carriage adapted to travel on said track, a bucket having pivoted bottom sections, mechanism for permitting of the opening and closing of said pivoted bottom sections, a driving-wheel, driven wheels adjacent to the driving-wheel, drums mounted on the axes of the driven wheels, brakes adapted to be engaged by the driven wheels, eccentrics mounted on said axes of the driven wheels, levers for operating the eccentrics, whereby the driven wheels may be thrown in or out of engagement with the driving-wheel, or in or out of engagement with the brakes, a reversing-wheel, a lever for throwing the same into operative engagement with the driving-wheel and one of the driven wheels, a hoisting-cable connected to the carriage and extending downwardly to and around a pulley, or equivalent, connected to the bucket, and thence extended for connection to one of the drums, a counterweight, an opening and closing cable connected to the carriage and thence extended to the counterweight, and from the counterweight to one of the drums, and another cable engaging the last-named drum and continuing from the last-referred-to cable, and extended for connection to the opening and closing mechanism of the bucket.

3. In an apparatus for elevating, transporting, and delivering material, the combination, of a track, a carriage adapted to travel on said track, a bucket having pivoted bottom sections, mechanism for permitting of the opening and closing of said pivoted bottom sections, a driving-wheel, driven wheels adjacent thereto, drums mounted on the axes of the driven wheels, brakes adapted to be engaged by the driven wheels, eccentrics mounted on the axes of the driven wheels, levers for controlling said eccentrics, whereby the driven wheels may be thrown into or out of engagement with the driving-wheel, or into or out of engagement with the brakes, a spring engaging one of the levers to normally hold the driven wheel controlled thereby out of engagement with its brake, a reversing-gear normally out of engagement with the driving-wheel, a lever for throwing said reversing-gear into operative engagement with the driving-wheel and with one of the driven wheels, a hoisting-cable connected to the carriage and extending downwardly to and around a pulley, or equivalent, connected to the bucket, and thence extended for connection to one of the drums, a counterweight, an opening and closing cable connected to the carriage and thence extended to the counterweight, and from the counterweight to one of the drums, and another cable engaging the last-named drum, and continuing from the last-referred-to cable, and extended for connection to the opening and closing mechanism of the bucket.

4. In an apparatus for elevating, transporting, and delivering material, the combination, of a track, a carriage adapted to travel on said track, a bucket having bottom sections, links extending upwardly from the bottom sections of the bucket to a connecting-point, sets of arms extending upwardly from the bottom sections of the bucket at opposite ends of said bucket, and converging at their upper ends, a pivot-shaft connecting the sets of arms, a pulley mounted on the shaft, chains or cables connected to one of the bottom sections, at opposite ends thereof and extending laterally around a pulley carried by the other bottom section, and thence around a terminal pulley and from the latter downwardly to the pivot-shaft, drums, mechanism for causing the rotation of either of said drums in either direction, mechanism for stopping the rotation of either of said drums, a hoisting-cable connected to the carriage and extending downwardly to and around a pulley, or equivalent, connected to the bucket, and thence extended for connection to one of the drums, a counterweight, an opening and closing cable connected to the carriage and thence extended to the counterweight, and from the counterweight to one of the drums, and another cable engaging the last-named drum and continuing from the last-referred-to cable, and extended for connection to the pulley of the pivot-shaft of the bucket.

5. In an apparatus for elevating, transporting, and delivering material, the combination of a track, a carriage adapted to travel on said track, a bucket having pivoted bottom sections, mechanism for permitting of the opening and closing of said pivoted bottom sections, drums, mechanism for causing the rotation of either of said drums in either direction, mechanism for stopping the rotation of either of said drums, a hoisting-cable connected to the carriage and extending downwardly to and around a pulley, or equivalent for connection to one of the drums, a counterweight, an opening and closing cable connected to the carriage, and thence extended to the counterweight, and from the counterweight to one of the drums, another cable engaging the last-referred-to drum and continuing from the last-referred-to cable and extended for connection to the opening and closing mechanism of the bucket, a stop carried by the cable which is connected to the opening and closing mechanism of the bucket, and a contact with which the stop engages.

6. The combination, of a track, stop mechanism adapted to travel on the track, a drum, a ratchet-wheel mounted on the axis of the drum, a pawl normally engaging the ratchet-wheel, means for disengaging said pawl from the ratchet-wheel, a cable connected to the stop mechanism, and extending therefrom in one direction around the drum and thence extended from the drum in an opposite direction and around a bearing, and thence back to the stop mechanism, and means for causing the travel of the stop mechanism on the track.

7. The combination, of a track, stop mechanism adapted to travel thereon, a drum, a ratchet-wheel mounted on the axis of the drum, a pawl adapted normally to engage the ratchet-wheel, means for disengaging the pawl from the ratchet-wheel, a pulley having a longitudinal spring-cushioned or yielding bearing, a cable connected to the stop mechanism and extending therefrom in one direction and around the drum, and thence from the drum in the other direction and around the pulley, and thence back to the stop mechanism, and means for causing the travel of the stop mechanism on the track.

8. In an apparatus for elevating, transporting, and delivering material, the combination, of a track, a carriage adapted to travel on said track, a bucket having pivoted bottom sections, mechanism for permitting of the opening and closing of said pivoted bottom sections, a driving-wheel, driven wheels located adjacent thereto, drums mounted on the axes of the driven wheels, eccentrics mounted on the axes of the driven wheel, levers controlling said eccentrics, whereby the driven wheels are thrown into or out of engagement with the driving-wheel, a hoisting-cable connected to the carriage and extending downwardly to and around a pulley, or equivalent, connected to the bucket, and thence extended for connection to one of the drums, a counterweight, an opening and closing cable connected to the carriage, and thence extended to the counterweight and from the counterweight to one of the drums, another cable engaging the last-named drum and continuing from the last-referred-to cable, and extended for connection to the opening and closing mechanism of the bucket, stop mechanism adapted to travel on the track, and to be locked in any position thereon, and means for releasably locking the carriage to the stop mechanism.

In testimony whereof I affix my signature in presence of two witnesses.

OLE JOHNSON.

Witnesses:
A. L. MORSELL,
ANNA V. FAUST.